United States Patent Office 3,694,377
Patented Sept. 26, 1972

1

3,694,377
BUTYL RUBBER CATALYST SYSTEM
Joseph P. Kennedy, Akron, Ohio, and Francis P. Baldwin,
 Summit, N.J., assignors to Esso Research and Engineering Company
No Drawing. Continuation-in-part of application Ser. No.
 712,605, Mar. 13, 1968, now Patent No. 3,560,458.
 This application Dec. 2, 1970, Ser. No. 94,537
Int. Cl. C08d 3/02
U.S. Cl. 252—431 R                              10 Claims

ABSTRACT OF THE DISCLOSURE

A catalyst system for preparing homopolymers and copolymers of cationically polymerizable monomers wherein the catalyst system comprises an organic halide promoter and a cationic catalyst of the type $Al(M)_2R$, where M is a branched or straight-chain $C_1$ to $C_{12}$ alkyl and R is M, hydrogen or halogen. The organic halide may be represented by the general formula

wherein X is a halogen, $R_1$ is selected from the group consisting of hydrogen, $C_1$ to $C_8$ alkyl, phenyl and $C_2$ to $C_8$ alkenyl, $R_3$ is selected from the group consisting of hydrogen, $C_1$ to $C_8$ alkyl, phenyl, $C_2$ to $C_8$ alkenyl and phenylalkyl and $R_2$ is selected from the group consisting of $C_2$ to $C_8$ alkyl, $C_2$ to $C_8$ alkenyl, phenyl, phenylalkyl, alkylphenyl, $C_3$ to $C_{10}$ cycloalkyl and

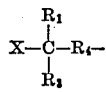

wherein $R_1$, $R_3$ and X are as defined above and $R_4$ is selected from the group consisting of phenylene, biphenyl, $\alpha,\omega$-diphenylalkane and —$(CH_2)_n$—, wherein $n$ is an integer of from 1 to 10.

CROSS-REFERENCE TO RELATED APPLICATIONS

This application is a continuation-in-part of U.S. application Ser. No. 712,605, filed Mar. 13, 1968, now U.S. Patent 3,560,458.

BACKGROUND OF THE INVENTION

It is known that certain halogen containing ethers in combination with organoaluminum compounds initiate the polymerization of trioxa-cycloalkanes by a ring opening mechanism, see for example, U.S. Patent 3,197,420.

Certain prior art disclosures indicate that isobutylene may be polymerized to high molecular weights in the presence of solvents having a dipole moment greater than 1, see for example, U.S. Patent 3,123,592.

SUMMARY OF INVENTION

Surprisingly, it has been found that cationically polymerizable monomers may be homopolymerized or copolymerized to high molecular weights in the presence of a Friedel-Crafts type catalyst in the presence of an organic halide promoter containing at least one dissociable halogen. The activity of the catalyst is independent of the polarity of the solvent and is adversely affected by certain oxygen containing organic halides.

DETAILED DESCRIPTION OF INVENTION

The invention relates to the use of a novel catalyst system for the polymerization of cationically polymerizable monomers. It further relates to the production of high molecular weight homopolymers and copolymers by cationic initiation of polymerization of monoolefins and multiolefins by means of the novel catalyst disclosed herein.

In particular this invention relates to the polymerization of mono- and diolefins with a catalyst system which comprises: (1) a catalyst of the type $Al(M)_2R$, where M is a branched or straight chain $C_1$ to $C_{12}$ alkyl and R is selected from the group consisting of M, hydrogen and halogen, and (2) a promoter comprising an organic compound containing a dissociable halogen. More particularly, the promoter component of the present novel catalyst system is represented by the following structural formula:

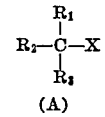

(A)

wherein X is halogen, $R_1$ is selected from the group consisting of hydrogen, $C_1$ to $C_8$ alkyl, phenyl and $C_2$ to $C_8$ alkenyl, $R_3$ is selected from the group consisting of hydrogen, $C_1$ to $C_8$ alkyl, phenyl, $C_2$ to $C_8$ alkenyl and phenylalkyl and $R_2$ is selected from the group consisting of $C_2$ to $C_8$ alkyl, $C_2$ to $C_8$ alkenyl, phenyl, phenylalkyl, alkylphenyl, $C_3$ to $C_{10}$ cycloalkyl and

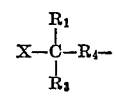

wherein $R_1$, $R_3$ and X are as defined above and $R_4$ is selected from the group consisting of phenylene, biphenyl, $\alpha,\omega$-diphenylalkane and —$(CH_2)_n$—, wherein $n$ is an integer of from 1 to 10.

Substitution of the above structural formula radical for $R_2$ in Formula A results in the following formula:

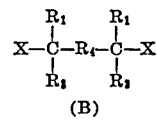

(B)

wherein X, $R_1$, $R_3$ and $R_4$ are as defined above. The compounds represented by structural Formula B contain two dissociable halides and may be considered as merely multiples of those compounds represented by structural Formula A. In addition, to the promoters represented by structural Formulae A and B, the promoter component of the present novel catalyst system can further be selected from the dihalomethanes, e.g., dichloromethane and dibromomethane.

Still more particularly, this invention relates to the high molecular weight polymers and copolymers of isoolefins produced with the above-described novel catalyst system. Most particularly, this invention relates to the production of high molecular weight butyl type rubbers, i.e., a copolymer of an isoolefin, such as isobutene, and multiolefin, such as isoprene, at temperatures considerably higher than have heretofore been possible.

Butyl type rubbery polymers produced by a Friedel-Crafts catalyst system have long been known in the art. See, for example, Chapter 24 of Synthetic Rubber by G. S. Whitby, John Wiley and Sons, Inc. (1954), and U.S. Patent 2,356,128 to Thomas et al., among many others. The catalyst most frequently used for the production of butyl type rubber has been aluminum chloride dissolved in methyl or ethyl chloride solution. However, aluminum chloride is only sparingly soluble in alkyl halide solutions and this low solubility has given rise to many difficulties in the control of the butyl polymerization reaction.

It has been proposed to polymerize and copolymerize hydrocarbons of the olefin series by means of a catalyst represented by the formula $R_nAlX_m$, where R is a monovalent alkyl hydrocarbon radical, X is halogen and $m$ and $n$ are integers from 1 to 2 inclusive and $m+n=3$. See, for example, U.S. Patents 2,220,930 and 2,387,517. Coassigned U.S. patent application, Ser. No. 266,267, filed Mar. 20, 1963, describes a liquid catalyst system for the production of butyl type rubbers. The catalyst system described therein comprises an alkyl aluminum halide with a ratio of alkyl groups to halogen atoms corresponding approximately to the formula $AlRX_2$, where R is an alkyl group and X represents a halogen atom. It was pointed out in that application that where the ratio of alkyl groups to halogen atoms is reversed, i.e., the formula is $AlR_2X$, no polymerization will occur.

It has been further reported by some workers that tertiary butyl halides can have a poisoning effect on Friedel-Crafts polymerization catalysts, e.g. $AlCl_3$. It has also been proposed that the incorporation of between 6 and 100 parts of tertiary butyl halide per million parts of hydrocarbon feed promotes the polymerization and activates the Friedel-Crafts catalyst. See, for example, U.S. Patent 2,581,154. It has, however, been impossible up to this time to prepare elastomeric products from isoolefins, such as isobutene, with a dialkylaluminum halide, trialkylaluminum or dialkylaluminum hydride catalyst.

The present invention provides a soluble catalyst system for the production of butyl type rubber and other polymers derived from cationically polymerizable monomers which will alleviate many operating difficulties and provide other benefits such as a more uniform product, a small amount of catalyst residue in the product and an ease of handling a liquid catalyst. Use of the novel catalyst system of the present invention provides improved catalyst efficiency together with greater accuracy and control of the polymerization process. The novel catalyst system of the present invention further provides a catalyst system which permits the production of high molecular weight homopolymers and copolymers of monoolefins at considerably higher temperatures, e.g., about −30° C., than have heretofore been possible. The present invention permits the polymerization of monoolefins and polyolefins in either a conventional alkyl halide solvent, an aliphatic hydrocarbon solvent or carbon disulfide solvent or permits their polymerization in little or no solvent to yield an elastomeric product. In the latter case, the unreacted monomer mixture functions as the diluent.

The exact nature and objects of this invention will be more clearly perceived and fully understood by referring to the following description.

It has now been discovered that elastomeric or thermoplastic polymers may be produced by polymerizing monoolefins or multiolefins with a catalyst system comprising (1) a catalyst of the type $Al(M)_2R$ where M is a branched or straight chain $C_1$ to $C_{12}$ alkyl and R is selected from the group consisting of M, hydrogen and halogen and (2) a promoter selected from the group consisting of dihalomethanes and organic halogenides represented by the following structural formula:

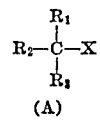

(A)

wherein X is halogen, $R_1$ is selected from the group consisting of hydrogen, $C_1$ to $C_8$ alkyl, phenyl, and $C_2$ to $C_8$ alkenyl, $R_3$ is selected from the group consisting of hydrogen, $C_1$ to $C_8$ alkyl, phenyl, $C_2$ to $C_6$ alkenyl and phenylalkyl and $R_2$ is selected from the group consisting of $C_2$ to $C_8$ alkyl, $C_2$ to $C_8$ alkenyl, phenyl, phenylalkyl, alkylphenyl, $C_3$ to $C_{10}$ cycloalkyl and

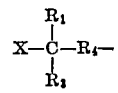

wherein $R_1$, $R_3$ and X are as defined above and $R_4$ is selected from the group consisting of phenylene, biphenyl, $\alpha,\omega$-diphenylalkane and $-(CH_2)_n-$, wherein $n$ is an integer of from 1 to 10.

The olefin polymerization feeds employed in connection with the above-described catalyst system are those known to be cationically initiated. Preferably, the olefin polymerization feeds employed in connection with the above-described catalyst system are those olefinic compounds conventionally used in the preparation of butyl type rubbery polymers. The polymers are prepared by reacting a major portion, e.g., about 70–99.5 parts by weight, preferably 85–99.5 parts by weight, of an isoolefin, such as isobutene, with a minor portion, e.g., about 30–0.5 parts by weight, preferably 15–0.5 parts by weight, of a multiolefin, such as butadiene or isoprene. The polymers so formed comprise about 85 to 99.5 weight percent of combined isoolefin and about 15 to about 0.5 weight percent of combined multiolefin. The isoolefin, in general, is a $C_4$ to $C_8$ compound, e.g., isobutene or 2-methyl-1-butene, 3-methyl-1-butene, 2-methyl-2-butene, and 4-methyl-1-pentene. The multiolefin, in general, is a $C_4$ to $C_{14}$ conjugated diolefin, e.g., isoprene, butadiene, 2,3-dimethyl-1, 3-butadiene, myrcene, 6,6-dimethylfulvene and piperylene. The preferred polymer is obtained by reacting 95–99.5% by weight of isobutene with 0.5–5% by weight of isoprene.

Cyclodiolefin compounds, such as cyclopentadiene and methylcyclopentadiene, as well as compounds such as β-pinene and divinyl benzene may be copolymerized with the isoolefin either in addition to the diolefin or in place of the diolefin. These additional diolefins may be incorporated in amounts up to about 6% by weight, based on isoolefin, preferably in amounts from 0.3 to about 2.0 wt. percent. Copolymers formed from combinations of the above compounds have improved ozone resistance and compare favorably in molecular weight with the butyl rubber copolymers produced by the practice of this invention.

In addition to the above-described butyl type olefin feeds, isoolefins, such as isobutene, may be homopolymerized or copolymerized with other polymerizable monoolefins, such as styrene, with the instant novel catalyst system. Furthermore, multiolefins such as butadiene and isoprene may be homopolymerized or copolymerized with other monoolefins of this invention.

The solvents which can be used in the practice of this invention are the conventional alkyl halide solvents, such as methyl chloride, chlorobenzene, methyl bromide, and carbon tetrachloride. In addition, carbon disulfide, its analogues and homologues may be used. The preferred solvent is methyl chloride. Moreover, aliphatic hydrocarbon solvents, mixtures thereof, or mixtures with halogen-containing solvents, that are liquid at the polymerization temperature may be used in the practice of this invention. These include $C_2$ through $C_8$ saturated aliphatic and alicyclic hydrocarbons, such as pentane, isopentane, hexane, isooctane, methylcylohexane, cyclopentane, cyclohexane, etc. Because of the solubility of the catalyst system used in the present process, only very small amounts of solvent, e.g., less than 10 wt. percent, need be used.

The catalyst system, which is an essential feature of the present novel process, comprises (1) a catalyst of the type $Al(M)_2R$, where M is branched or straight chain $C_1$ to $C_{12}$ alkyl and R is selected from the group consisting of M, hydrogen and halogen, and (2) a promoter comprising an organic compound containing a dissociable halogen. For purposes of brevity, the compounds represented by the formula $Al(M)_2R$ will be referred to as the "catalyst" though it should be realized that these compounds will, by themselves, not ordinarily act as a catalyst in the olefin polymerizations of this invention. The organic compound containing the dissociable halide will be referred to as the "promoter."

The catalyst components utilized in the present novel catalyst system are those compounds represented by the general formula $Al(M)_2R$, where M is a branched or straight chain alkyl group having from 1 to 12 carbon atoms and R is selected from the group consisting of M, hydrogen and halogen. Suitable catalyst compounds coming within the scope of the above general formula include: diethyl aluminum chloride, dipropyl aluminum chloride, diisopropyl aluminum chloride, dibutyl aluminum chloride, diisobutyl aluminum chloride, dipentyl aluminum chloride, dihexyl aluminum chloride, didecyl aluminum chloride, diethyl aluminum bromide, diisobutyl aluminum bromide, dioctyl aluminum bromide, didodecyl aluminum bromide, diethyl aluminum iodide, dibutyl aluminum iodide, diheptyl aluminum iodide, dinonyl aluminum iodide, ethyl propyl aluminum chloride, propyl butyl aluminum chloride, ethyl propyl aluminum bromide, diethyl aluminum hydride, dibutyl aluminum hydride, dihexyl aluminum hydride, trimethyl aluminum, triethyl aluminum, methyl diethyl aluminum, dimethyl ethyl aluminum, triisobutyl aluminum, trihexyl aluminum, etc. The preferred catalyst is diethyl aluminum chloride which will be used here for illustrative purposes.

Diethyl aluminum chloride, which is commercially available, is a clear colorless liquid with a melting point of −74° C., and a boiling point of 208° C. The substance is highly reactive with oxygen and will burst into flames in air and react violently with water. It is miscible with saturated aliphatic and alicyclic hydrocarbons, chlorinated hydrocarbons, carbon disulfides, etc. Diethyl aluminum chloride may be prepared from aluminum triethyl and aluminum chloride according to the following formula:

$$2Al(C_2H_5)_3 + AlCl_3 \rightarrow 3Al(C_2H_5)_2Cl$$

The promoters which form the second component of the instant two-component catalyst system for the present novel process contain a dissociable halogen and are selected from the group consisting of dihalomethanes and organic halogenides represented by the following formula:

wherein X is halogen, $R_1$ is selected from the group consisting of hydrogen, $C_1$ to $C_8$ alkyl, phenyl and $C_2$ to $C_8$ alkenyl, $R_3$ is selected from the group consisting of hydrogen, $C_1$ to $C_8$ alkyl, phenyl, $C_2$ to $C_8$ alkenyl and phenylalkyl and $R_2$ is selected from the group consisting of $C_2$ to $C_8$ alkyl, $C_2$ to $C_8$ alkenyl, phenyl, phenylalkyl, alkylphenyl, $C_3$ to $C_{10}$ cycloalkyl and

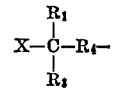

wherein $R_1$, $R_3$ and X are as defined above and $R_4$ is selected from the group consisting of phenylene, biphenyl, $\alpha,\omega$-diphenylalkane and —$(CH_2)_n$—, wherein $n$ is an integer of from 1 to 10.

The phenylalkyl and alkylphenyl radicals described above are univalent radicals which are respectively derived by the removal of a hydrogen atom from the alkyl side chain of an aromatic hydrocarbon and by the removal of a hydrogen atom from the ring of an alkyl substituted aromatic hydrocarbon. In general, the alkyl groups can be branched or straight chain and can vary in length from 1 to about 12 carbon atoms and advantageously will vary in length from 1 to about 6 carbon atoms. The aromatic hydrocarbon of the alkylphenyl radical can be monosubstituted or polysubstituted.

The promoters of the present novel catalyst system are characterized by the fact they ionize, i.e., they dissociate, under the conditions prevailing, into a halogen anion and a carbonium ion. The promoters are further characterized by a structural similarity. For the most part, the halogen of either the monohalogenated or dihalogenated compounds represented by Formulae A and B is attached to a carbon atom selected from the group consisting of a tertiary carbon atom, a secondary carbon atom, an allylic carbon atom and a benzylic carbon atom. In addition to the foregoing, it has somewhat surprisingly been found that aliphatic and aromatic halogenides containing the isobutyl halide grouping are also effective as promoters in the present catalyst system.

Examples of suitable promoter compounds representative of structural Formula A include: isopropyl chloride, isopropyl bromide, isobutyl chloride, secondary butyl chloride, secondary butyl iodide, tertiary butyl chloride, tertiary butyl bromide, 2-chlorohexane, tri-n-butyl chloromethane, 9-chloro-heptadecane, 2-chloro-2-methyldecane, dimethyl phenyl chloromethane, methyl ethyl phenyl chloromethane, methyl pentyl phenyl bromomethane, diphenyl chloromethane, triphenyl chloromethane, methyl phenyl chloromethane, benzyl chloride, benzyl bromide, benzyl fluoride.

Still other suitable examples of promoter compounds representative of Formula A include: 1-chloro-butene-2, allyl chloride, methallyl chloride, crotyl chloride, 3-chloro-butene-1, 2-ethyl-3-chloropropene-1, 2-hexyl-3-chloropropene-1, 1-chloro-hexene-2, 1-bromo-heptene-2, dimethyl benzyl bromomethane, 3-phenylpropyl dimethyl chloromethane, methyl dibenzyl chloromethane, n-butyl benzyl chloromethane, o-methyl benzyl chloride, o-propyl benzyl chloride, p-hexyl benzyl chloride, p-octyl benzyl bromide, cyclopropyl dimethyl chloromethane, cyclopentyl methyl chloromethane, cyclodecyl methyl chloromethane and cyclohexyl bromomethane.

Further examples of promoter compounds and those which are specifically representative of the above recited structural Formula B include: 2,5-dichloro-2,5-dimethyl hexane, p-dichloromethylbenzene, 2,4-dichloropentane, 2,4-dichloro-2,4-dimethyl pentane, 5,7-dibromo-5,7-dimethyl undecane, 5,8-difluoro-5,8-dimethyl dodecane, 3,5-dichloro-5-methyl hexene-1, 2,5-dichloro-2,5-diphenyl hexane, 1,4-dichloro-1,1′,4,4′-tetraphenyl butane, 2,5-dichloro-2,5-di(p-methylphenyl)-hexane, 2,5-dichloro-2,5-dibenzyl hexane, 2,7-dibromo-2,7-dicyclopropyl octane, 4,4′-dichloromethylbiphenyl and 4,4′-dichloromethyl-diphenylethane.

The amount of promoter needed to initiate polymerization varies with the type and activity of the promoter employed. In the case of tertiary butyl chloride and benzyl chloride as little as 0.001 mole of promoter per mole of diethyl aluminum chloride can initiate polymerization whereas in the case of secondary butyl chloride, about 2 moles of promoter per mole of diethyl aluminum chloride is necessary to initiate polymerization. In general, the ratio of promoter to catalyst will vary between about 0.0001 mole and about 30 moles of promoter per mole of catalyst, and will advantageously range between about 0.001 mole and about 20 moles. For the most active promoters, the ratio of promoter to catalyst will most advantageously vary between about 0.01 mole and about 5 moles of promoter per mole of catalyst and preferably between about 0.5 mole and 1.5 moles.

As heretofore mentioned, the present catalyst system permits butyl type rubber polymerizations to be carried out at considerably higher temperature than have previously been possible. In general, temperatures ranging from about 0° C. to about —100° C. may be employed. Preferably the polymerization will be carried out at a range of from about —27° C. to about —78° C. The pressure employed for butyl type rubber polymerizations utilizing the instant novel process will generally be at or near atmospheric.

The various aspects and modifications of the present invention will be made more clearly apparent by reference to the following description and accompanying examples.

Molecular weights of the polymers prepared in the subsequent examples were obtained from viscosity measurements of 0.1% polymer solutions in diisobutylene at 20° C. The intrinsic viscosities were obtained from single measurements using the slope of the curve, ln $\eta_{inh}/C$ (inherent viscosity/concentration). The viscosity average molecular weights were calculated from the equation:

$$\ln M_v = 12.48 + 1.565 \ln[\eta]$$

Physical properties of vulcanizates were determined according to the methods described in ASTM D 412-51T.

Example 1

In runs 1–5, comparative experiments were carried out with only the promoter being changed in each run. Thus, 0.00575 mole of diethyl aluminum chloride was mixed with 0.627 mole (50 ml.) of isobutene in 50 ml. of methyl chloride and stirred at —50° C. Even with vigorous agitation over a period of about 10 minutes, no polymerization occurred. To separate quiescent mixtures of this composition, the various promoters were added. In run 1, the promoter solution was prepared by diluting 0.5 ml. of tertiary butyl chloride with 50 ml. of methyl chloride. Similarly, in run 2, the promoter solution was prepared by diluting 10 ml. of isobutyl chloride with 10 ml. of methyl chloride. Promoters for runs 3, 4 and 5 were utilized in an undiluted form. Experimental details and results of runs 1–5 are summarized in Table I.

TABLE I

| Run | Promoter | Moles of promoter introduced $\times 10^2$ | Product yield (grams) | Molecular weight (viscosity) $\times 10^{-3}$ | Grams product per mole of promoter |
|---|---|---|---|---|---|
| 1 | t-Butyl chloride | 0.0007 | 1 | 667 | 143,000 |
| 2 | Isobutyl chloride | 0.058 | 2.4 | 831 | 4,130 |
| 3 | sec. Butyl chloride | 1.2 | 4.5 | 705 | 369 |
| 4 | Isopropyl chloride | 1.14 | 30.3 | 253 | 2,680 |
| 5 | Methyl chloride | Large | None | | |

The data in Table I show that diethyl aluminum chloride may be used as a catalyst for the polymerization of isobutene, provided that a suitable promoter is employed. The data also show that methyl chloride, a nondissociable halide, is inoperative as a promoter in the present novel process.

Example 2

In runs 6–13, a monomer mixture consisting of 100 ml. of 97 volume percent isobutene and 3 volume percent isoprene (B–3 feed) was employed. A typical polymerization was carried out as follows:

A charge consisting of 100 ml. of B–3 feed and 90 ml. of methyl chloride was placed in a reaction vessel and stirred at a selected polymerization temperature. After thermoequilibrium had been attained 1.3 ml. (0.01 mole) of diethyl aluminum chloride dissolved in 10 ml. of methyl chloride was added. Thereafter, precooled promoter was introduced dropwise into the quiescent mixture. Polymerization started immediately upon promoter introduction and was terminated with chilled methanol.

The promoter solution of runs 6–11 was prepared by dissolving 1 ml. of tertiary butyl chloride in 100 ml. of methyl chloride. This corresponded to a concentration of 0.0915 mole/liter. Experimental details and results are summarized and compared to Enjay Butyl 218 in Table II. Enjay Butyl 218 is a commercial grade of butyl rubber prepared from isobutene and isoprene. It has a mole percent unsaturation of between about 1.5 and about 2.0, a Mooney viscosity (ML 3 min. at 260° F.) of between 50 and about 60 and a molecular weight of between 375,000 and about 450,000.

TABLE II

| Run | Temperature, —° C. | Promoter | Amount of promoter introduced, ml. | Conversion, percent | Molecular weight $\times 10^{-3}$ | Iodine number | Mole percent unsaturated |
|---|---|---|---|---|---|---|---|
| 6a | —27 | t-Butyl Cl | 0.03 | 71 | 117 | 10.4 | 1.53 |
| 7a,c | —44 | do | 0.06 | 31.2 | 288 | 8.7 | 1.28 |
| 8b | —50 | do | 0.45 | 14.7 | 289 | 9.8 | 1.44 |
| 9 | —50 | do | | 32.9 | 352 | 10.7 | 1.56 |
| 10 | —50 | do | | 26.7 | 336 | 9.5 | 1.4 |
| 11d | —50 | do | 0.21 | 11.4 | 580 | 12.3 | 1.81 |
| 12 | —30 | Undiluted sec. butyl Cl | 2.00 | 75.8 | 113 | 10.5 | 1.55 |
| 13 | —27 | Undiluted isopropyl Cl | 0.5 | 73 | 133 | | |
| "Butyl 218" | —100 | AlCl₃, catalyst | | | 350–400 | | 1.5–2.0 | a Reaction terminated after 5 minutes due to formation of large amounts of polymer.
b AlEt₂Cl catalyst treated with NaCl₂.
c 0.02 mole AlEt₂Cl in the B-3 feed.
d Fresh AlEt₂Cl prepared by slowly filtering through fritted glass under nitrogen atmosphere (moisture content 10 p.p.m.).

The data in Table II show that diethyl aluminum chloride may be used as a catalyst for the polymerization of butyl type rubbers, provided that a suitable promoter is present and that such rubbers compare favorably with commercially available Enjay Butyl 218 with regard to molecular weight and mole percent unsaturation.

Portions of the polymerization products of runs 9–13 were cured for 10, 20, 30, 40 and 60 minutes at a temperature of 307° F., according to the following cure recipe.

| | Parts per hundred parts of rubber |
|---|---|
| Isobutene-isoprene rubber | 100 |
| HAF black (high abrasion furnace black) | 50 |
| Necton 60 [1] | 10 |
| ZnO | 5 |
| Sulfur | 2 |
| Stearic acid | 1 |
| PBN (phenyl-$\beta$-naphthylamine) | 1 |
| Methyl tuads (tetramethyl thiuram disulfide) | 1 |
| Altax (benzothiazyl disulfide) | 1 |

[1] A refined naphthenic oil of about 60 sec. viscosity at 210° F.

The physical properties of the vulcanizates are shown and compared with Enjay Buty 218 in Table III. The data therein show that good quality butyl rubber, as measured by tensile strength, modulus and elongation, can be obtained at higher process temperatures than present commercial temperatures (−100° C.) using the present novel process.

minated with chilled methanol. The results of runs 14–17 are summarized in Table IV.

TABLE IV

| Run | Promoter | Moles of promoter ×10² | Product yield (grams) | Mole weight ×10⁻³ | Grams product per mole of promoter |
|---|---|---|---|---|---|
| 14 | Methallyl chloride | 0.05 | 3.4 | 685 | 6,800 |
| 15 | Allyl chloride | 0.25 | 3.7 | 746 | 1,480 |
| 16 | Crotyl chloride | 0.000727 | 0.99 | 604.5 | 137,000 |
| 17 | 3-chloro-1-butene | 0.00098 | 0.783 | 294.6 | 80,000 |

The data in Table IV show that diethyl aluminum chloride may be used as a catalyst for the polymerization of isobutene provided that a halogenated organic compound in which the halogen is in the allylic position is used as a promoter.

Example 4 (runs 18–21)

For runs 18, 19 and 20, a stock solution was prepared by mixing 100 ml. of isobutene (1.254 moles) and 100 ml. of methyl chloride at −50° C. Thereafter, 0.01 mole of diethyl aluminum chloride was added and the mixture stirred. No polymerization occurred. Five ml. of this stock solution were withdrawn for each run and to each sample were added promoter solutions prepared as follows. In runs 18, 5 drops of a solution prepared by dissolving 0.5 gram of a diphenylchloromethane in 50 ml. of methyl chloride were added. For runs 19, 0.5 ml. of benzylchloride was mixed with 50 ml. of methyl chloride; 1 ml. of this solution was further diluted with 40 ml. of methyl chloride and 5 drops of this solution were used to promote the polymerization. In run 20, 0.5 gram of triphenylchloromethane were added to 5 ml. of methyl chloride and

TABLE III

| | Minutes cured, 307° F. | | | | | | | | | | | | | | |
|---|---|---|---|---|---|---|---|---|---|---|---|---|---|---|---|
| | 10 | | | 20 | | | 30 | | | 40 | | | 60 | | |
| Run | T | M | E | T | M | E | T | M | E | T | M | E | T | M | E |
| 9 | 1,790 | 480 | | 2,240 | 980 | | | | | 2,280 | 1,420 | | 2,350 | 1,680 | |
| 10 | 1,810 | 460 | | 2,030 | 880 | | | | | 2,120 | 1,330 | | 2,310 | 1,600 | |
| 11 | 2,030 | 240 | 890 | | | | 2,350 | 590 | 690 | | | | 2,410 | 830 | 610 |
| 12 | | | | 880 | 350 | | 1,150 | 500 | | 1,250 | 620 | | 1,400 | 780 | |
| 13 | | | | 1,120 | 350 | | 1,350 | 500 | | 1,520 | 620 | | 1,780 | 780 | |
| "Butyl 218" | 2,460 | 370 | 860 | 2,660 | 730 | 690 | | | | 2,690 | 1,170 | 570 | 2,730 | 1,270 | 550 |

Note.—T=Tensile, p.s.i.; M=300% modulus, p.s.i.; E=Elongation, percent.

Example 3

In runs 14 and 15, 0.00575 mole of diethyl aluminum chloride was mixed with 0.627 mole (50 ml.) of isobutene in 50 ml. of methyl chloride and stirred at −50° C. No polymerization occurred. Thereafter precooled promoter was introduced dropwise into the quiescent mixture. Polymerization started immediately upon promoter introduction and was terminated with chilled methanol.

In runs 16 and 17, a charge consisting of 10 ml. of isobutene and 10 ml. of methyl chloride was placed in a reaction vessel and stirred at −50° C. To this monomer-solvent mixture was added 1 ml. of a diethyl aluminum chloride solution prepared by dissolving 1.3 ml. of diethyl aluminum chloride in 8.7 ml. of methyl chloride. No polymerization occurred. A promoter solution was prepared by dissolving 0.25 ml. of crotyl chloride (run 16) and 0.25 ml. of 3-chloro-1-butene (run 17) in 25 ml. of methyl chloride. After the reaction vessel reached thermoequilibrium, the precooled promoter solution was added dropwise to the quiescent mixture. Polymerization started immediately and after about 10 minutes was ter- 0.5 ml. of this solution was used to promote the reaction. Polymerization commenced immediately in runs 18 and 19 and began slowly in run 20. In run 21, 10 ml. of isobutene, 10 ml. of methyl chloride and 0.13 ml. of diethyl aluminum chloride were mixed and stirred at −50° C. No polymerization occurred. A promoter solution was prepared by adding 0.1 ml. of 1-chloroethylbenzene to 10 ml. of methyl chloride. Four drops of this solution were gradually added to the monomer-solvent-catalyst mixture. In all four runs, polymerization was terminated with cold methanol and the product dried in vacuo at 60° C. Table V summarizes the results obtained.

TABLE V

| Run | Promoter | Moles of promoter introduced | Product yield, gram | Molecular weight ×10⁻³ | Grams product per mole of promoter | Time for run minutes |
|---|---|---|---|---|---|---|
| 18 | Diphenylchloromethane | 6.9×10⁻⁵ | 0.934 | 294 | 13,500 | 25 |
| 19 | Benzylchloride | 3.7×10⁻⁷ | 0.195 | 784 | 527,000 | 26 |
| 20 | Triphenylchloromethane | 1.8×10⁻⁴ | 0.833 | 314.5 | 4,600 | 200 |
| 21 | 1-chloroethylbenzene | 9.2×10⁻⁶ | 0.295 | 325 | 31,900 | 3 |

Example 5 (runs 22–28)

Various runs were made utilizing a catalyst system of diethyl aluminum chloride and 2,5-dichloro-2,5-dimethyl hexane. The procedure used was identical to that of the previous examples in that the monomer and solvent were initially mixed, followed by the addition of the catalyst. Thereafter, the promoter was added dropwise to the quiescent mixture. In runs 22–27, the monomer charge consisted of isobutene whereas in run 28 the monomer charge consisted of 97 ml. of isobutene and 3 ml. of isoprene. Results of these runs are tabulated in Table VI.

TABLE VI

| Run | Monomer feed, ml. | Solvent $CH_3Cl$, ml. | $AlEt_2Cl$ catalyst, mole | Temperature, °C. | Amount of promoter introduced, moles | Product, grams | Percent conversion | Molecular weight $\times 10^{-3}$ |
|---|---|---|---|---|---|---|---|---|
| 22 | 25 | 25 | $2.5\times10^{-3}$ | −27 | $4.55\times10^{-6}$ | 0.77 | 4.38 | 89.2 |
| 23 | 25 | 25 | $2.5\times10^{-3}$ | −50 | $4.55\times10^{-6}$ | 4.18 | 23.6 | 507 |
| 24 | 25 | 25 | $2.5\times10^{-3}$ | −78 | $4.55\times10^{-6}$ | 9.67 | 54.6 | 1,387 |
| 25 | 100 | 100 | $1.05\times10^{-2}$ | −100 | $9.07\times10^{-5}$ | 10.0 | 14.1 | 649 |
| 26 | 100 | 100 | $1.05\times10^{-2}$ | −27 | $3.78\times10^{-5}$ | 30.0 | 42.3 | 346 |
| 27 | 200 | | $1.05\times10^{-2}$ | −9 | $75.6\times10^{-5}$ | 45.0 | 31.7 | 105 |
| 28 | 100 | 100 | $1.05\times10^{-2}$ | −28 | $5.67\times10^{-5}$ | 13.0 | 18.3 | 215 |

Portions of the product of runs 28 were compounded according to the cure recipte of Example 2 and cured for 10, 20, 40 and 60 minutes respectively at 307° F. Results of the inspections of the physical properties are listed in Table VII.

TABLE VII

| | Minutes cured at 307° F. | | | | | | | | | | |
|---|---|---|---|---|---|---|---|---|---|---|---|
| | 10 | | | 20 | | | 40 | | | 60 | | |
| Run | T | M | E | T | M | E | T | M | E | T | M | E |
| 28 | (¹) | (¹) | (¹) | 2,410 | 480 | 740 | 2,570 | 800 | 620 | 2,670 | 920 | 600 |

¹ No cure.

NOTE.—T=Tensile, p.s.i.; M=300% Modulus, p.s.i.; E=Elongation, percent.

EXAMPLE 6

Five ml. of isobutene and 0.2 ml. of $AlEt_2Cl$ were mixed and stirred at 0° C. No reaction occurred. Subsequently, 5 ml. of isobutene and 5 ml. of spectroquality dichloromethane were mixed and stirred at 0° C. No reaction occurred in this instance. To this second solution was added 1 drop (0.025 ml.) of purified $AlEt_2Cl$. Sudden, vigorous polymerization took place yielding a product of viscosity average molecular weight of about 7000.

Dibromomethane ($8.3\times10^{-3}$ mole) was slowly added to a quiescent charge of 5 ml. of isobutene, 5 ml. of methyl chloride and 0.065 ml. ($5\times10^{-4}$ mole) of $AlEt_2Cl$ at −50° C. Polymerization commenced immediately upon the introduction of the dibromomethane and was terminated after 40 minutes with cold methanol. The resulting polymer had a viscosity average molecular weight of about 640,000. A similar run utilizing an isobutene-isoprene feed yielded a polymer with a viscosity average molecular weight of about 136,300.

Example 6 illustrates that dihalomethanes can be utilized as promoters in the present novel catalyst system.

Example 7

A monomer mixture consisting of 97 ml. of isobutene and 3 ml. of isoprene along with 100 ml. of methyl chloride was charged to a reaction vessel and stirred at −100° C. To this monomer-solvent mixture were added 1.8 ml. (0.1 mole) of diethyl aluminum hydride dissolved in 10 ml. of methyl chloride. No polymerization reaction occurred. Subsequently, a solution of 0.5 ml. of tertiary butyl chloride in 50 ml. of methyl chloride was prepared and added dropwise to the quiescent monomer-solvent-catalyst mixture. Polymerization started immediately. A total of 13.9 ml. (0.012 mole) of the tertiary butyl chloride promoter solution was added during the polymerization. The reaction was terminated at a low conversion by introducing cold methanol. A white rubbery solid was obtained having a viscosity average molecular weight of 738,000 (I.V.=1.934), an iodine number of 27.8 and a mole percent unsaturation of 4.1.

Example 8

Runs 29 and 30 were made using a catalyst system comprising diisobutyl aluminum hydride and tertiary butyl chloride. In run 29, 100 ml. of isobutene and 100 ml. of methyl chloride were mixed and stirred at temperatures of −30° C., −50° C., −78° C. and −100° C. After thermoequilibrium was attained, 0.01 mole (1.8 ml. of catalyst in 10 ml. of $CH_3Cl$) of diisobutyl aluminum hydride was added to the monomer-solvent mixture and stirring was continued for about 10 minutes. No polymerization reaction occurred. A promoter solution was prepared by mixing 0.5 ml. of tertiary butyl chloride and 10 ml. of methyl chloride and portions of this solution were added dropwise to the monomer-solvent-catalyst mixture. Polymerization began upon promoter introduction and was terminated with cold methanol. The polymer product was washed and dried in vacuo at 60° C. Run 30 was a repeat of run 29, except that the monomer charge consisted of 97 ml. of isobutene and 3 ml. of isoprene instead of 100 ml. of isobutene. Table VIII summarizes the results of the two runs.

TABLE VIII

| | Run 29 | | | |
|---|---|---|---|---|
| Temperature, °C | −30 | −50 | −78 | −100 |
| Molecular weight $\times 10^{-3}$ | 202 | 239 | 573 | 27 |
| Product, grams | 4.0 | 30.7 | 3.6 | 57.2 |
| Percent conversion | 5.75 | 43.2 | 5.08 | 80.7 |
| Grams product per mole of promoter | 4,820 | 46,500 | 6,670 | 1,245 |
| Moles of promoter introduced $\times 10^3$ | 0.83 | 0.66 | 0.54 | 4.6 |
| | Run 30 | | | |
| Temperature, °C | −30 | −50 | −78 | −100 |
| Molecular weight $\times 10^{-3}$ | 63 | 210 | 314 | 897 |
| Product, grams | 29.5 | 13.1 | 1.3 | 1.0 |
| Percent conversion | 41.6 | 18.5 | 1.8 | 1.41 |
| Iodine number | 8.7 | 18.5 | 16.9 | 19.1 |
| Mole percent unsaturation | 1.28 | 2.72 | 2.48 | 2.81 |
| Grams product per mole of promoter | 11,800 | 4,260 | 1,810 | 855 |
| Moles of promoter introduced $\times 10^3$ | 2.5 | 3.1 | 0.72 | 1.17 |

Example 9

In run 31, 100 ml. of isobutene and 100 ml. of methyl chloride were mixed and stirred at −50° C. Thereafter, 0.01 mole of diisobutyl aluminum chloride in 10 ml. of methyl chloride was added. Following a period of inactivity, 19 drops ($4.4\times10^{-5}$ moles of t-butyl chloride) of a promoter solution, prepared by mixing 0.5 ml. of tertiary butyl chloride and 50 ml. of methyl chloride, were added to initiate polymerization. A total of 6.1 grams of product having a viscosity average molecular weight of 192,000 were recovered. Run 32 was a repeat of run 31 except that (1) the monomer charge consisted of 97 ml. of isobutene and 3 ml. of isoprene instead of 100 ml. of isobutene and (2) a total of $7.6\times10^{-5}$ moles of tertiary butyl chloride was added to initiate polymerization. This run yielded 32 grams of product which had a viscosity average molecular weight of 299,000, an iodine number of 9.8 and a mole percent unsaturation of 1.44.

Example 10

A charge consisting of 100 ml. of isobutene, 100 ml. of methyl chloride and 0.020 mole of AlEt$_2$Cl was mixed and stirred for 105 minutes at −50° C. No reaction occurred. A promoter solution prepared by mixing 0.5 ml. of tertiary butyl bromide in 50 ml. of methyl chloride, was added dropwise over a period of 33 minutes to the monomer-solvent-catalyst mixture. A total of 5.3×10$^{-5}$ moles of tertiary butyl bromide was added. The polymerization reaction was terminated with cold methanol and the resultant product recovered and dried in vacuo at 60° C. A total of 6.0 grams of product, having a viscosity average molecular weight of 458,000, were recovered. This represents a theoretical promoter efficiency of 11,300 grams of product per mole of promoter.

Example 11

Runs 33 and 34 were performed using a catalyst system comprising diethyl aluminum bromide and tertiary butyl bromide. In run 33, 100 ml. of isobutene and 100 ml. of methyl bromide were mixed and stirred at temperatures of −30° C., −50° C., −78° C., and −100° C. After thermoequilibrium, 0.01 ml. of CH$_3$Br) was added to the monomer-solvent mixture and stirring was continued for about 10 minutes. No polymerization occurred. A promoter solution was prepared by mixing 0.5 ml. of tertiary butyl bromide and 50 ml. of methyl bromide and portions of this solution were added dropwise to the reaction mixture. Polymerization started soon thereafter and was terminated with cold methanol. The polymer product was washed and dried in vacuo at 60° C. Run 34 was a repeat of run 33 except that a monomer charge of 97 ml. of isobutene and 3 ml. of isoprene was substituted for the 100 ml. of isobutene. Table IX summarizes the results of these two runs.

TABLE IX

|  | Run 33 | | | |
|---|---|---|---|---|
| Temperature, °C | −30 | −50 | −78 | −100 |
| Molecular weight ×10$^{-3}$ | 170 | 320 | 908 | 202 |
| Product, grams | 5.3 | 10.0 | 12.0 | 6.9 |
| Percent conversion | 7.6 | 14.3 | 17.2 | 9.9 |
| Grams product per mole of promoter | 57,600 | 103,000 | 172,000 | 23,300 |
| Moles promoter introduced | 9.2×10$^{-5}$ | 9.7×10$^{-5}$ | 6.6×10$^{-5}$ | 2.97×10$^{-4}$ |

|  | Run 34 | | | |
|---|---|---|---|---|
| Temperature, °C | −30 | −50 | −78 | −100 |
| Molecular weight ×10$^{-3}$ | 133 | 184 | 565 | 73 |
| I$_2$ number | 10.9 | 9.5 | 7.2 | 9.2 |
| Mole percent unsaturation | 1.6 | 1.4 | 1.06 | 1.35 |
| Product, grams | 23.9 | 20.5 | 15.9 | 12.5 |
| Percent conversion | 34.1 | 28.3 | 22.7 | 17.9 |
| Grams product per mole of promoter | 70,200 | 89,200 | 88,500 | 14,900 |
| Moles promoter introduced | 3.4×10$^{-4}$ | 2.3×10$^{-4}$ | 1.8×10$^{-4}$ | 8.4×10$^{-4}$ |

Example 12

In runs 35–37, catalyst systems comprising an aluminum trialkyl and tertiary butyl chloride were investigated. The aluminum trialkyls used in these runs were trimethyl aluminum, triethyl aluminum and triisobutyl aluminm, respectively. A charge of 100 ml. of isobutene and 100 ml. of methyl chloride were mixed and stirred at selected temperatures. After thermoequilibrium, the aluminum trialkyl catalyst was added and stirring was continued for 5 minutes. No reaction occurred. A tertiary butyl chloride promoter was thereupon added to initiate polymerization. Results of these runs are tabulated in Table X.

TABLE X

|  | Run 35 | | | | |
|---|---|---|---|---|---|
| Temperature, °C | −20 | −30 | −50 | −78 | −96 |
| Mole catalyst Al(CH$_3$)$_3$ | 0.01 | 0.01 | 0.01 | 0.01 | 0.01 |
| Mole promoter ×10$^3$ | 0.27 | 0.133 | 1.14 | 1.15 | 16.9 |
| Percent conversion | 27.2 | 3.6 | 41.5 | 5.3 | 0.7 |
| Molecular weight ×10$^{-3}$ | 113 | 136 | 158 | 310 | 133 |

|  | Run 36 | | | | |
|---|---|---|---|---|---|
| Mole catalyst Al(C$_2$H$_5$)$_3$ | [1] 0.00025 |  | 0.00025 | 0.01 | 0.0095 |
| Mole promoter ×10$^3$ | 0.275 |  | 0.027 | 0.12 | 0.084 |
| Percent conversion | ~75 |  | ~10 | 1.0 | 9.5 |
| Molecular weight ×10$^{-3}$ | 25 |  | 74 | 113 | 206 |

|  | Run 37 | | | | |
|---|---|---|---|---|---|
| Mole catalyst Al(IC$_4$H$_9$)$_3$ | 0.01 | 0.01 | 0.01 | 0.01 | 0.01 |
| Mole promoter ×10$^3$ | 1.0 | 1.46 | 0.57 | 11.6 |  |
| Percent conversion | 20.3 | 43.5 | 13.0 | 1.5 |  |
| Molecular weight ×10$^{-3}$ | 40.4 | 46 | 94 | 157 |  |

[1] At −24° C.

Example 13

A study of the effect of temperature on the polymerization of isobutene-isoprene mixtures was made. Mixtures of isobutene and isoprene were prepared and designated B-0, B-3, B-6 and B-8. The compositions of these mixtures were as follows:

B-0 contained 100 volume percent isobutene.

B-3 contained 97 volume percent isobutene and 3 volume percent isoprene.

B-6 contained 94 volume percent isobutene and 6 volume percent isoprene.

B-8 contained 92 volume percent isobutene and 8 volume percent isoprene.

Each of the above mixtures was tested at four different temperature levels. For each run, 100 ml. of the isobutene-isoprene monomer mixture to be tested, i.e., B-0, B-3, B-6 or B-8, and 100 ml. of methyl chloride solvent were mixed and placed in a reaction vessel. Thereafter 0.1 mole of diethyl aluminum chloride catalyst was added and the system thermoequilibrated at pre-selected temperatures of −40° C., −60° C., −78° C. and −100° C. A promoter solution was prepared by adding 1 ml. of tertiary butyl chloride to 100 ml. of methyl chloride. Promoter concentration was 0.0915 mole per liter in methyl chloride. After 10–15 minutes of stirring, the tertiary butyl chloride promoter solution was introduced dropwise into the quiescent monomer-solvent-catalyst mixture. Polymerization started immediately. Conversions were controlled by the amount of promoter added and were kept low to maintain initial monomer concentration, but high enough to obtain a sufficient sample for compounding. The results are set forth in Table XI.

TABLE XI

|  | Temperature, °C. | | | |
|---|---|---|---|---|
| B-Number | −40 | −60 | −78 | −100 |
| B-0: |  |  |  |  |
| Milliliters promoter solution added | 0.3 | 0.18 | 0.21 | 0.25 |
| Grams polymer | 1.5 | 4.3 | 7 | 12 |
| Percent conversion | 4.3 | 12.3 | 20 | 34.2 |
| I.V.[1] | 1.33 | 1.835 | 2.119 | 2.531 |
| Molecular weight ×10$^{-3}$ | 411 | 679 | 853 | 1,125 |
| I$_2$ number |  |  |  |  |
| B-3: |  |  |  |  |
| Milliliters promoter solution added | 0.15 | 0.12 | 0.12 | 0.3 |
| Grams polymer | 8.8 | 10 | 10.4 | 7 |
| Percent conversion | 11.5 | 14 | 15 | 10 |
| I.V. | 0.929 | 1.369 | 2.150 | 2.000 |
| Percent gel |  |  | 14.4 | 1.6 |
| Molecular weight ×10$^{-3}$ | 234 | 431 | 871 | 797 |
| I$_2$ number | 9.9 | 9.7 | 13.2 | 9.9 |
| Mole percent unsaturation | 1.46 | 1.43 | 1.94 | 1.46 |
| B-6: |  |  |  |  |
| Milliliters promoter solution added | 0.3 | 0.24 | 0.36 | 0.6 |
| Grams polymer | 4 | 10.1 | 14.1 | 7 |
| Percent conversion | 5.6 | 14.3 | 19.9 | 10 |
| I.V. | 0.733 | 1.193 | 1.530 | 1.150 |
| Percent gel |  |  | 22 | 15.9 |
| Molecular weight ×10$^{-3}$ | 161 | 346 | 512 | 327 |
| I$_2$ number | 19.4 | 27.5 | 24.4 | 22.4 |
| Mole percent unsaturation | 2.96 | 4.05 | 3.59 | 8.30 |

TABLE XI—Continued

| B-Number | Temperature, °C | | | |
|---|---|---|---|---|
| | −40 | −60 | −78 | −100 |
| B-8: | | | | |
| Milliliters promoter solution added | 0.3 | 0.45 | 0.39 | 0.6 |
| Grams polymer | 8 | 20 | 14 | 6.5 |
| Percent conversion | 11.3 | 28 | 20 | 9.3 |
| I.V.[1] | 0.696 | 1.146 | 1.213 | 1.270 |
| Percent gel | | | 36.5 | 42 |
| Molecular weight ×10⁻³ | 149 | 324 | 356 | 382 |
| I₂ number | 27.4 | 34.9 | 28.3 | 26.6 |
| Mole percent unsaturation | 4.03 | 5.15. | 4.17 | 3.93 |

[1] Intrinsic viscosity.

Portions of some of the polymer products of Example 13 were cured according to the recipe set forth in Example 2. Inspections of the resulting vulcanizates are compared to Enjay Butyl 218 and 325 in Table XII. Specifications for Enjay Butyl 218 have been presented in connection with Example 2. Enjay Butyl 325 is a commercial grade of butyl rubber manufactured by the Enjay Chemical Company. It has a molecular weight of between about 275,000 and about 350,000, a mole percent unsaturation of between about 2.0 and about 2.5 and a Mooney viscosity (ML 8 min. at 212° F.) of between about 41 and about 49. Commercial grades of butyl rubber are prepared at about −100° C. in methyl chloride diluent using a catalyst solution of aluminum chloride in methyl chloride.

TABLE XII

| | Experimental butyls, feed of— | | | Commercial butyls, feed of— | |
|---|---|---|---|---|---|
| | B-8 | B-8 | B-6 | Butyl 218 | Butyl 325 |
| Temperature, °C | −60 | −78 | −78 | ∼−100 | ∼−100 |
| Cure at 307° F.: | | | | | |
| 10 minutes: | | | | | |
| Tensile, p.s.i | 2,420 | 2,750 | 2,340 | 2,460 | 2,230 |
| 300% modulus, p.s.i | 890 | 950 | 520 | 370 | 1,150 |
| Elongation, percent | 660 | 670 | 780 | 860 | 710 |
| 20 minutes: | | | | | |
| Tensile, p.s.i | 2,290 | 2,710 | 2,530 | 2,660 | 2,360 |
| 300% modulus, p.s.i | 1,370 | 1,300 | 900 | 730 | 1,380 |
| Elongation, percent | 470 | 500 | 630 | 690 | 520 |
| 40 minutes: | | | | | |
| Tensile, p.s.i | 2,290 | 2,460 | 2,440 | 2,690 | 2,340 |
| 300% modulus, p.s.i | 1,830 | 1,930 | 1,340 | 1,170 | 1,820 |
| Elongation, percent | 380 | 390 | 490 | 570 | 380 |
| 60 minutes: | | | | | |
| Tensile, p.s.i | 2,220 | 2,610 | 2,420 | 2,730 | 2,470 |
| 300% modulus, p.s.i | 2,100 | 2,550 | 1,630 | 1,270 | 2,210 |
| Elongation, percent | 350 | 330 | 440 | 550 | 370 |

From the data in Tables XI and XII, it can be seen that the use of the instant novel catalyst system results in the production of butyl type rubbers having physical properties which compare favorably to commercially available butyl rubbers.

Example 14

To a charge of 0.03 mole isobutene and 0.000238 mole AlEt₂Cl in 2.5 ml. methyl chloride there was added 0.009 mole t-butaneol at −50° C. No reaction occurred. When 0.0096 mole of t-butyl chloride was added to the above mixture, no reaction occurred. No polymerization was apparent when the temperature was raised to −27° C.

Example 15

An experiment similar to that of Example 14 was carried out wherein the t-butanol and t-butyl chloride were added in an equimolar mixture dropwise to a charge of isobutene and AlEt₂Cl in methyl chloride at −50° C. Small amounts of very low molecular weight polymer were formed.

Example 16

To a charge of 0.03 mole isobutene and 0.00024 mole AlEt₂Cl was added, dropwise, 0.007 mole of acetyl chloride (CH₃COCl) at −50° C. No polymerization took place nor could polymerization be effected by the addition of 0.007 mole of t-butyl chloride. Increasing the temperature to −30° C. had no effect.

Example 17

The experiment of Example 16 was repeated using as a cocatalyst, an equimolar mixture (0.028 mole of each) of acetyl chloride and t-butyl chloride. No polymerization could be initiated.

Experiments similar to Examples 14–17 above were attempted with β,β-dichloro-diethyl ether (Cl—CH₂CH₂—O—CH₂CH₂—Cl)

chloromethyl ether (CH₃—O—CH₂—Cl, t-butyl methyl ether (CH₃—C(CH₃)₂OCH₃) and thionylchloride (SOCl₂). Not only do these oxygen containing materials not act as cocatalysts, they appear to be poisons an indicated by the fact that addition of significant amounts of known cocatalyst (e.g. t-butyl chloride) did not result in initiation of polymerization.

Example 18

To a charge of 1.25 moles of isobutene in 200 ml. of methyl chloride was added 0.005 mole of nitroethane (C₂H₅NO₂) at −50° C. After thermoequilibration, 0.02 mole AlEt₂Cl was introduced. Yellow color developed immediately indicating complex formation but no polymer was formed. Stirring was continued for 20 minutes with no polymer formation. The addition of 0.002 mole of t-butyl chloride resulted in the slow polymerization of a polymer having a low molecular weight, i.e. 51,000.

Example 19

The experiment of Example 18 was repeated at temperatures of −78° C. and −100° C. using 0.0045 and 0.0094 mole of t-butyl chloride respectively. The polymer produced had a molecular weight of 73,000 in each instance.

These results indicate that C₂H₅NO₂ is not a cocatalyst but rather a molecular weight and rate poison. Similar experiments were performed using 2-nitropropane (CH₃—CH(NO₂)CH₃) and 2-nitro-2-methyl propane (CH₃—C(CH₃)₂NO₂) as cocatalysts. These materials were found to be completely inactive.

Not wishing to be bound by the theory it is thought that the inactivity of these oxygen containing materials is a result of the fact that the complexing of AlEt₂Ct with electron rich oxygen is more favored than reactions leading to carbonium ions.

Example 20

About 2 ml. of isobutylene dissolved in 15 ml. of chlorobenzene was placed in a test tube, cooled to −35° C. and 0.2 ml. of catalyst solution (1 ml. of AlEt₂Cl in 9 ml. of chlorobenzene) added. No reaction took place as evidenced by no precipitation upon the addition of copius amounts of methanol.

Example 21

Example 20 was repeated except that after holding the reactants and catalyst at −35° C. for 10 minutes, 2 drops of cocatalyst promoter solution (0.5 ml. t-butyl chloride plus 9.5 ml. chlorobenzene) was added. Polymer formed immediately with a temperature rise to 8° C. The polymer was precipitated with methanol. The product was a white polymer having a molecular weight of about 171,200. The yield was 0.76 g. (53.5% conversion).

This experiment clearly demonstrates that organic halogen compounds such as chlorobenzene which do not have dissociable halogens are ineffective as promoters despite the fact that they have a dipole moment greater than 1.

Example 22

About 100 ml. of an isobutylene-isoprene mixture (97 vol. percent isobutylene/3 vol. percent isoprene) was added dropwise to 100 ml. of pentene containing 0.01 mole of $AlEt_2Cl$. No reaction occurred for 73 minutes at $-50°$ C. Upon the addition of $1.5 \times 10^{-4}$ moles of cocatalyst (HCl dissolved in pentane) an immediate explosive polymerization occurred.

Example 23

The experiment of Example 22 was repeated using methyl chloride as the solvent. No cocatalyst was added. No polymerization occurred.

Examples 22 and 23 further illustrate that it is the proper selection of cocatalyst and not the dipole moment of the solvent which is important in the polymerization reaction. Pentane has a null dipole moment whereas methyl chloride has a dipole moment of 1.85.

Example 24

Unpurified ethyl chloride contains HCl as an impurity residue from the manufacturing process. A quantity of ethyl chloride, for use as solvent, was treated with KOH to remove most of the HCl. Two experiments were then performed to establish that it is the impurity (HCl) which aids in polymerization and not the ethyl chloride.

(A) 100 ml. of the isobutylene-isoprene mixture of Example 23 was added dropwise to 100 ml. of unpurified ethyl chloride containing 0.01 mole $AlEt_2Cl$, the entire reactant mixture being held at $-50°$ C. Polymerization occurred and after a reaction time of 60 minutes 72.0% yield was obtained.

(B) The experiment (A) above was repeated using as a cocatlyst ethyl chloride which had been treated with KOH to reduce the HCl content. After 60 minutes the polymer yield was only 16%.

These data demonstrate that ethyl chloride is an uneffective promoter and that its effectiveness as a promoter is dependent on the HCl impurity content.

Example 25

A stock solution comprising 70 ml. isobutene, 220 ml. of pentane and 1.3 ml. of $AlEt_2Cl$ dissolved in 10 ml. of pentane was prepared. Addition of the catalyst was made after cooling the solvent-monomer solution to $-50°$ C.

About 1.2 ml. of a solution of 0.1 ml. tertiary butyl chloride in 50 ml. pentane (equivalent to $29.4 \times 10^{-6}$ mole t-butyl chloride) was added to the stock solution as a promoter. Polymerization was instantaneous with 22.8% conversion. The polymer had a high molecular weight.

Example 26

The experiment of Example 25 was repeated except that instead of t-butyl chloride, ethyl chloride which had been purified by passing it over a 5 A. molecular sieve was used as the promoter. No polymerization took place.

Example 27

A stock solution comprising 50 ml. of isobutene and 0.72 ml. of $AlEt_2Cl$ dissolved in 50 ml. of methyl chloride was cooled to $-50°$ C. Ten drops (ca. 0.3 ml.) of ethyl chloride which had been purified by passing over a 5 A. molecular sieve were added to the solution. No polymerization took place.

Example 28

The experiment of Example 27 was repeated except that instead of ethyl chloride, about 0.12 ml. of t-butyl chloride was added as a promoter. Instantaneous polymerization results in a polymer having a molecular weight of 450,000.

Examples 25–28 demonstrate that (1) ethyl chloride which has been purified is not a catalyst promoter and (2) the dipole moment of the solvent is not a critical factor. Pentane has a null dipole moment but it was possible to initiate polymerization in the solvent. On the other hand, no polymerization took place in methyl chloride (a solvent with a dipole moment greater than 1) until t-butyl chloride was added.

Example 29

Various runs were made with selected monomers using the catalyst system of this invention. The monomers included propylene, butadiene, isoprene, styrene, alpha-methyl styrene and cyclopentadiene.

The catalyst (0.13 ml. $AlEt_2Cl$) was dissolved in methyl chloride to which was added 0.125 mole of the particular of monomer. The volume of the reactant mixture was brought up to 20 ml. at $-50°$ C. Promoter was then added and polymerization allowed to continue for 10 minutes after which time polymerization was quenched by the addition of cold methanol. The results of these experiments are shown in Tables XIIIa and XIIIb.

TABLE XIIIa.—POLYMERIZATION OF VARIOUS MONOMERS WITH $AlEt_2Cl$ AND VARIOUS COCATALYSTS

| Promoter | Propylene | | | | Isobutene | | | | Styrene | | | |
|---|---|---|---|---|---|---|---|---|---|---|---|---|
| | a | b | c | d | a | b | c | d[1] | a | b | c | d |
| HCl | $9.6 \times 10^{-4}$ | Small amount of oil | 0 | 0 | $4 \times 10^{-5}$ | .65 | 164.200 | $298 \times 10^{3}$— | $4 \times 10^{-6}$ | .74 | 186.000 | 5.02 |
| $CH_3$ \ CH—Cl / $CH_3$ | $1.1 \times 10^{-3}$ | .0033 | 3 | | $4.5 \times 10^{-3}$ | .014 | 3.4 | | $1.6 \times 10^{-4}$ | .04 | 270 | |
| $CH_3$—CH—$CH_2$—Cl | $2.5 \times 10^{-3}$ | Trace oil | | | $9.1 \times 10^{-5}$ | .019 | 210 | | $2.4 \times 10^{-5}$ | .15 | 64.000 | |
| $CH_3$ \| $CH_3$—C—$CH_2$—Cl | $5 \times 10^{-3}$ | do | 0 | 0 | $1.7 \times 10^{-5}$ | .069 | 3.940 | | $5 \times 10^{-5}$ | .26 | 52.000 | |
| $CH_3$ \| $CH_3$—C—Cl \| $CH_3$ | $9.1 \times 10^{-4}$ | .655 | 720 | 900 | $4.5 \times 10^{-5}$ | .59 | 132.000 | 380 | $6.9 \times 10^{-5}$ | 1.05 | 155.000 | 11.690 |
| $\phi$—$CH_2$—Cl | (²) | Polymerizes | | | $4.3 \times 10^{-5}$ | 3.15 | 734.000 | 353 | $2.2 \times 10^{-5}$ | 0.52 | 240.000 | 16.569 |
| H \| $\phi$—C—Cl \| $CH_3$ | $6.8 \times 10^{-4}$ | 0 | 0 | 0 | $6.7 \times 10^{-5}$ | .52 | 78.000 | 727 | $4.6 \times 10^{-5}$ | .37 | 82.000 | |

See footnotes at end of table.

TABLE XIIIa.—POLYMERIZATION OF VARIOUS MONOMERS WITH AlEt₂Cl AND VARIOUS COCATALYSTS

| Promoter | Monomer of— | | | | | | | | | | | |
|---|---|---|---|---|---|---|---|---|---|---|---|---|
| | Propylene | | | | Isobutene | | | | Styrene | | | |
| | a | b | c | d | a | b | c | [1]d | a | b | c | d |
| $\phi-\underset{\phi}{\overset{H}{\underset{|}{C}}}-Cl$ | 4.2×10⁻⁴ | 0 | 0 | 0 | 2.8×10⁻⁵ | .35 | 12,600 | 250 | 2.8×10⁻⁶ | .51 | 183,000 | 19,086 |
| $\phi-\underset{\phi}{\overset{\phi}{\underset{|}{C}}}-Cl$ | 1.8×10⁻⁴ | 0 | 0 | 0 | 3.1×10⁻⁵ | (³) | Low | | 9×10⁻⁵ | .06 | 650 | |

[1] Polyisobutene molecular weights are viscosity average values.
[2] Benzyl chloride.
[3] Very small amount.

NOTE.—a=Moles of promoter; b=Grams of product; c=Promoter efficiency grams/mole; d=Molecular weight.

TABLE XIIIB.—POLYMERIZATION OF VARIOUS MONOMERS WITH AlEt₂Cl AND VARIOUS PROMOTERS

| Promoter | Monomer of— | | | | | | | | |
|---|---|---|---|---|---|---|---|---|---|
| | Butadiene | | | | Isoprene | | | | α-Methyl styrene cyclopentadiene |
| | a | b | c | d | a | b | c | d | |
| HCl | 1.2×10⁻⁴ | .21 | 1,800 | 12,800 (12% gel), | 1.8×10⁻⁵ | .17 | 9,660 | 14,620 (6% gel), | Immediate polymerization,[1] |
| $\underset{CH_3}{\overset{CH_3}{\diagdown}}CHCl$ | 1.1×10⁻³ | 0 | 0 | | 1.4×10⁻³ | .001 | 86 | | |
| CH₃—CH—CH₂—Cl | 6.2×10⁻³ | .21 | 35 | 40,000 | 6.1×10⁻³ | .11 | 18 | | |
| $CH_3-\underset{|}{\overset{CH_3}{C}}-CH_2-Cl$ | 1.5×10⁻³ | .34 | 228 | 66% gel | 5.2×10⁻³ | .18 | 35 | 12,800 (6% gel), | |
| $CH_3-\underset{\underset{CH_3}{|}}{\overset{CH_3}{\overset{|}{C}}}-Cl$ | 4.5×10⁻⁴ | .86 | 1,900 | Insoluble | 4.5×10⁻⁴ | 2.38 | 5,300 | 91% gel | |
| φ—CH₂—Cl | 4.4×10⁻⁵ | .18 | 4,130 | 20,560 | 8.7×10⁻⁵ | .37 | 4,300 | Insoluble | |
| $\phi-\underset{CH_3}{\overset{H}{\underset{|}{C}}}-Cl$ | 4.5×10⁻⁴ | .36 | 807 | Insoluble | 4.6×10⁻⁴ | 1.33 | 2,260 | 61% gel | |
| $\phi-\underset{\phi}{\overset{H}{\underset{|}{C}}}-Cl$ | 5.6×10⁻⁴ | .41 | 742 | do | 2.8×10⁻⁴ | .52 | 1,850 | Insoluble | |
| $\phi-\underset{\phi}{\overset{\phi}{\underset{|}{C}}}-Cl$ | 7.2×10⁻⁵ | 0 | 0 | | 9×10⁻⁵ | 0 | 0 | | |

[1] AlEt₂Cl introduction, No promoter addition is necessary to obtain polymer,

NOTE.—a=Moles of Promoter; b=grams of product; c=Promoter efficiency grams/mole; d=Molecular weight, Based on these data, it appears that our catalyst system (AlEt₂Cl plus promoter) is suitable for use with any monomer whose polymerization is cationically initiated. It is obvious to one skilled in the art that not only may homopolymers be formed but copolymers of the suitable (cationically polymerizable) monomers may also be formed.

Surprisingly, it is noted that α-methyl styrene and cyclopentadiene may be polymerized without the use of a promoter to high molecular weights. This result is wholly unexpected since styrene itself cannot be polymerized by AlEt₂Cl alone and prior are methods of polymerizing α-methyl styrene do not result in such high molecular weights.

One skilled in the art will readily recognize that AlEt₂Cl can be used as a catalyst to form copolymers of α-methyl styrene and cyclopentadiene. It is known to form crosslinked styrene polymers using divinyl benzene as the crosslinking agent. Similarly, a crosslinked α-methyl styrene may be prepared by the addition of about 1 to 10 wt. percent preferably about 1–4 wt. percent of divinyl benzene to the monomer mix.

Although other cationically polymerizable monomers ordinarily require the use of a promoter in conjunction with AlEt₂Cl it is possible to copolymerize minor amounts of these monomers (i.e. isoprene, butadiene, isobutene) with a major portion of α-methyl styrene or cyclopentadiene. Preferably, less than 10 wt. percent of the second monomer is employed. More preferably, about 0.5 to about 4 wt. percent of a cationically polymerizable monomer is co-reacted with α-methyl styrene or cyclopentadiene.

A particularly advantageous polymer is formed by reacting about 0.5 to about 4 wt. percent of isoprene or bicyclopentadiene with styrene or α-methyl styrene to form a high molecular weight styrene type polymer.

Example 30

A stock solution was prepared consisting of 50 ml. of 3-methyl butene-1 dissolved in 200 ml. of methyl chloride to which catalyst (1.3 ml. AlEt₂Cl in 10 ml. of methyl chloride) was added.

A cocatalyst solution was prepared by dissolving 0.5 ml. t-butyl chloride in 50 ml. of methyl chloride.

(A) 10 milliliters of stock solution was cooled to −50° C. About 3.7 ml. (ca. 3.3×15⁻⁴ mole t-butyl chloride) of cocatalyst solution were added. Instantaneous polymerization resulted in 1.1 g. of polymer (ca. 82.6% conversion) having a molecular weight of 7860.

While a number of specific embodiments of the present invention have been hereinbefore described, it is obviously possible to employ other embodiments and various equivalent modifications and variations thereof without departing from the spirit of the invention.

What is claimed is:

1. A catalyst system for the production of polymer products of cationically polymerizable monomers consisting essentially of (1) a catalyst of the type $Al(M)_2R$, wherein M is a $C_1$ to $C_{12}$ alkyl and R is selected from the group consisting of M, hydrogen and halogen and (2) a promoter selected from the group consisting of (a) dihalomethanes and (b) organic halogenides having at least one dissociable halogen atom represented by the following structural formula:

wherein X is a halogen, $R_1$ is selected from the group consisting of hydrogen, $C_1$ to $C_8$ alkyl, phenyl and $C_2$ to $C_8$ alkenyl, $R_3$ is selected from the group consisting of hydrogen, $C_1$ to $C_8$ alkyl, phenyl, $C_2$ to $C_8$ alkenyl and phenylalkyl and $R_2$ is selected from the group consisting of $C_2$ to $C_8$ alkyl, $C_2$ to $C_8$ alkenyl, phenyl, phenylalkyl, alkylphenyl, $C_3$ to $C_{10}$ cycloalkyl and

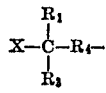

wherein $R_1$, $R_3$ and X are as defined above and $R_4$ is selected from the group consisting of phenylene, biphenyl α,ω-diphenylalkane and $-(CH_2)_n-$, wherein $n$ is an integer of from 1 to 10, the ratio of promoter to catalyst being about 0.0001 mole to about 30 moles of promoter per mole of catalyst.

2. The catalyst system of claim 1 wherein the catalyst is diethyl aluminum chloride.

3. The catalyst system of claim 1 wherein the catalyst is diethyl aluminum hydride.

4. The catalyst system of claim 1 wherein the catalyst is triethyl aluminum.

5. The catalyst system of claim 1 wherein the promoter is tertiary butyl chloride.

6. The catalyst system of claim 1 wherein the promoter is crotyl chloride.

7. The catalyst system of claim 1 wherein the promoter is benzyl chloride.

8. The catalyst system of claim 1 wherein the ratio of promoter to catalyst is about 0.001 mole to about 20 moles of promoter per mole of catalyst.

9. The catalyst system of claim 8 wherein the ratio of promoter to catalyst is about 0.01 mole to about 5 moles of promoter per mole of catalyst.

10. The catalyst system of claim 9 wherein the ratio of promoter to catalyst is about 0.5 mole to about 1.5 moles of promoter per mole of catalyst.

References Cited
UNITED STATES PATENTS

| | | | |
|---|---|---|---|
| 2,970,992 | 2/1961 | Geiser et al. | 252—431 R X |
| 3,349,064 | 10/1967 | Gumboldt et al. | 260—80.7 |
| 3,458,493 | 7/1969 | Gaeth et al. | 252—43 R X |
| 3,481,911 | 12/1969 | Kahle et al. | 252—43 R X |
| 3,489,729 | 1/1970 | Kahle et al. | 252—43 R X |

PATRICK P. GARVIN, Primary Examiner

U.S. Cl. X.R.

260—85.3